United States Patent [19]

Yamazaki et al.

[11] 4,356,046
[45] Oct. 26, 1982

[54] METHOD FOR THE MANUFACTURE OF A BATTERY SEPARATOR USING TUBING

[75] Inventors: Hiroaki Yamazaki, Sowa; Takao Hasegawa, Kuki, both of Japan

[73] Assignee: Firma Carl Freudenberg, Weinheim an der Bergstrasse, Fed. Rep. of Germany

[21] Appl. No.: 187,998

[22] Filed: Sep. 17, 1980

[30] Foreign Application Priority Data

Sep. 17, 1979 [JP]  Japan ................................ 54-119622

[51] Int. Cl.³ .................. B29C 27/12; B32B 31/26
[52] U.S. Cl. ...................... 156/86; 174/DIG. 8; 264/230; 264/342 R
[58] Field of Search ............. 156/84, 85, 86, 293, 156/294; 174/DIG. 8; 264/230, 342 R

[56] References Cited

U.S. PATENT DOCUMENTS

| | | | |
|---|---|---|---|
| 2,972,000 | 2/1961 | Boriolo | 156/86 |
| 2,989,785 | 6/1961 | Stahl | 156/86 |
| 3,037,529 | 6/1962 | Hancik | 174/DIG. 8 |
| 3,093,448 | 6/1963 | Kirkpatrick et al. | 174/DIG. 8 |

*Primary Examiner*—Caleb Weston
*Attorney, Agent, or Firm*—Kenyon & Kenyon

[57] ABSTRACT

To manufacture a tubular battery separator with a closed end, a tubular body is formed from a sheet of a separator material with a preponderant content of stretched thermoplastic fibers; the overlapping edges which occur welded together; a disc fitted to the inside diameter inserted from one end into the tubular body to a position near the other end leaving an overhanging edge; the overhanging edge softened by heating, causing it to shrink; and the softened and shrunk edge pressed against the disc so as to join the disc to the tubular body.

4 Claims, 7 Drawing Figures

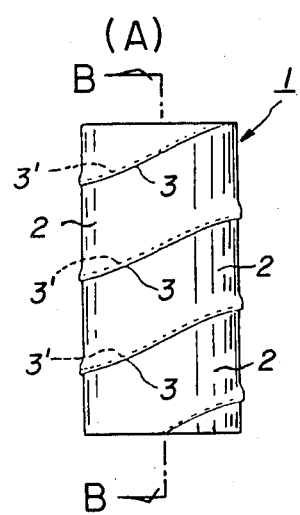
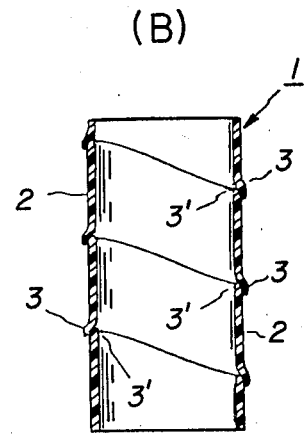
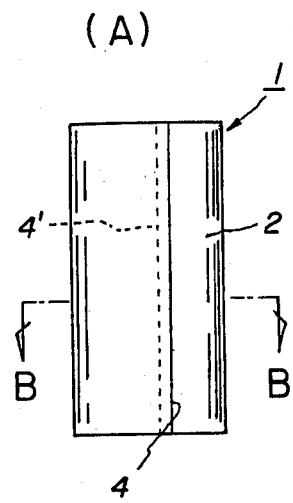
Fig. 1 (A)   Fig. 2 (B)   Fig. 3 (A)
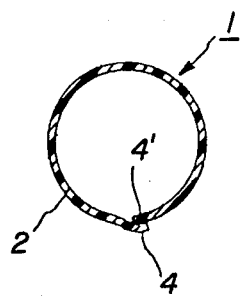
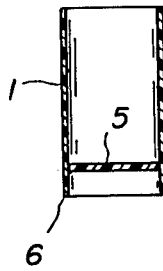
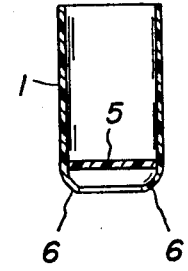
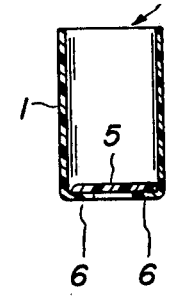
Fig. 4   Fig. 5   Fig. 6 (B)   Fig. 7 (C)

METHOD FOR THE MANUFACTURE OF A BATTERY SEPARATOR USING TUBING

BACKGROUND OF THE INVENTION

This invention relates to alkaline batteries in general and more particularly to a method for the manufacture of a battery separator for use in alkaline batteries.

In one known manufacturing method for battery separators, the absorptive separator material is wound into a cylindrical shape, whereupon the joint edges lying on each other are cemented together, for instance, using a bonding agent of the carboxyl cellulose type. A circular bottom plate is punched out of thick paper, inserted into the end of the cylindrical body and cemented to the latter, whereby a battery separator with a closed end is obtained. Cementing the parts together is laborious and expensive, and great technical difficulties were encountered in obtaining a joint of sufficient strength. It was also possible for the bonding agent to be attached by the electrolyte, which, besides impairing the strength of the joint, can lead to contamination and the development of a short circuit.

It is thus the object of the present invention to develop a method for manufacturing a battery separator with a closed end, which ensures that the above mentioned disadvantages are avoided.

SUMMARY OF THE INVENTION

According to the present invention, this problem is solved by forming a tubular body from a fabric web with a preponderant content of stretched, thermoplastic fibers, welding the overlapping edges together, inserting from one end, a disc fitting the inside diameter, softening the overhanging end by heating causing it to shrink and pressing against the disc so as to join the disc to the tubular body.

BRIEF DESCRIPTION OF THE DRAWINGS

FIG. 1 shows a tubular body which is formed by a helically wound bonded fiber fabric strip, the overlapping edges of which are welded together.

FIG. 2 shows the tubular body according to FIG. 1, in a longitudinal cross section.

FIG. 3 shows a tubular body which consists of a cylindrically rolled bonded fiber fabric strip, with overlapping and welded edges which extend parallel to the axis of the tubular body.

FIG. 4 is a cross section of the tubular body according to FIG. 3.

FIG. 5 illustrates the position in which the disc at the bottom is inserted into the tubular body.

FIG. 6 shows the deformation of the overhanging ends of the tubular body after heat had been applied, due to the occurring shrinkage.

FIG. 7 shows the pressing of the softened, shrunk, overhanging end of the tubular body against the disc at the bottom.

DETAILED DESCRIPTION OF THE INVENTION

The tubular battery separator of the present invention can be manufactured as follows:

First, the tubular body is wound from a separator material with a predominant content of thermoplastic fibers. Suitable separator materials include non-woven planar structures, woven planar structures, papers or planar structures produced by paper making techniques with a preponderant content of thermoplastic fibers. From these planar structures strips (FIG. 2) are cut and wound in helical form, the edges of the lateral joints 3 and 3' overlapping. The overlapping joint edges are heated and welded together, whereby a rigid tubular body is obtained.

According to another method for producing such a tubular body, according to FIG. 3 the strip 2 is rolled parallel to its longitudinal edges 4 and 4' in such a manner that the longitudinal edges 4 and 4' overlap and can be welded together.

The disc 5 to be used as the bottom plate is stamped out from an alkali-resistant woven planar structure, a non-woven planar structure, a paper or a planar structure produced by a paper-making technique of synthetic fibers with an outside diameter which corresponds to the inside diameter of the tubular body. It is also possible to use an injection-molded disc of plastic. In this case, particularly high rigidity is obtained.

FIG. 4 shows that the tubular body has a circular cross section in all portions of its inside circumference, also if constructed in accordance with FIG. 3. The disc which is to be inserted can therefore also be circular.

FIG. 5 shows the disc 5 inserted into the lower end of the tubular body 1. The position of the arrangement is chosen so that the tubular body forms an edge 6 which extends beyond the lower boundary surface of the disc 5. The edge 6 is heated in order to soften the thermoplastic fibers and to cause shrinkage, which leads to a rolling inward of the overhanging edge 6 as shown in FIG. 6. By pressing the rolled edge against the underside of the disc 5, as shown in FIG. 7, a cemented thermoplastic joint with the disc 5 is obtained, whereupon the battery separator 7 with a closed end is ready for use.

The rolling caused by the spontaneous shrinkage of the over-hanging edge 6 considerably facilitates the joining of both parts. The intermediate stage according to FIG. 6 does not appear distinctly if the overhang edge 6, after being heated, is pressed together with the disc 5 in one operation.

The adjoining parts of the battery separator of the present invention are connected to each other by thermal welding. There are no secondary bonding agents and they also can therefore not change the electrolytic liquid adversely. The strength of the originally made joint is fully preserved during the entire life, whereby the possibility of particles of the electrically conducting material making contact with the counterelectrode in the region of the overlap zones, which would be equivalent to an internal short circuit and thereby, to a failure of the battery is prevented with certainty. The battery separator of the present invention can be used, besides in conventional storage batteries, also in dry cells. Its manufacture is illustrated by the following example:

In a first stage, a multi-layer bonded fiber fabric of 100% polypropylene fibers which had a thickness of 0.1 mm and an area weight of 50 g/m$^2$ was prepared. The bonded fiber fabric was slit in the longitudinal direction, whereby strips with a width of 30 mm each were obtained. The strips were wound up helically, and the overlapping zones were welded together in the vicinity of their edges by the action of heat. By cutting the tubular bodies so obtained to a desired length, individual cylindrical bodies were obtained.

Likewise, a circular disc was subsequently stamped out of a bonded fiber fabric of 100% polypropylene fibers with a thickness of 2 mm. The disc had a diameter which corresponded to the inside diameter of the cylindrical body. The disc was inserted into the cylindrical body in such a manner that the overhanging edge extended beyond the disc by about 2 mm. Subsequently, the overhanging end was held against a plate which had a temperature of 150° to 160° C., whereby the edge was rolled over inwardly due to the occurring shrinkage. The rolled edge was subsequently pressed against the disc, whereby a firm joint between the two parts was obtained.

What is claimed is:

1. A method for the manufacture of a tubular battery separator with a closed end, comprising: forming a tubular body from a sheet of a separator material with a preponderant content of stretched thermoplastic fibers, such that in forming said tubular body overlapping edges of said sheet occur; welding the overlapping edges which occur together; inserting a disc fitted to the inside diameter from one end into said tubular body to a position near the other end leaving an overhanging edge; softening the overhanging edge by heating, causing it to shrink; and pressing said softened and shrunk edge against the disc so as to join the disc to the tubular body.

2. The method according to claim 1 comprising forming said tubular body by helically winding said sheet.

3. The method according to claim 1 comprising forming said tubular body by rolling said material parallel to a longitudinal edge.

4. The method according to one of claims 1, 2 or 3 wherein said separator material is composed of polypropylene fibers.

* * * * *